3,360,518
TETRAHYDRO-HALO-SULFAMYL-
QUINAZOLINONES
Bola Vithal Shetty, Rochester, N.Y., assignor to Wallace & Tiernan Inc., Belleville, N.J., a corporation of Delaware
No Drawing. Filed Jan. 3, 1966, Ser. No. 517,995
11 Claims. (Cl. 260—256.5)

ABSTRACT OF THE DISCLOSURE

A class of compounds having diuretic properties has the following formula:

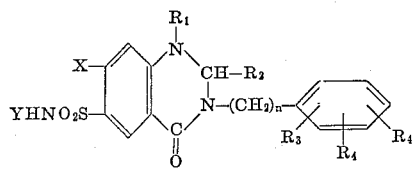

in which X is halogen or trifluoromethyl, Y is hydrogen or lower alkyl, $R_1$ is hydrogen or lower alkyl, $R_2$ is hydrogen, lower alkyl, thioalkyl, halogen substituted alkyl, aralkyl or substituted aralkyl, $R_3$ is hydrogen, lower alkyl, hydroxy, alkoxy, $NH_2$, $SO_2NH_2$, halogen or trifluoromethyl, $R_4$ and $R_5$ are any of $R_3$, and $n$ is an integer from 0–4.

A representative compound of the above class is 2-methyl-3-o-tolyl-6-sulfamyl-7 - chloro - 1,2,3,4 - tetrahydro-4-quinazolinone.

The above compound is made by reducing the corresponding unsaturated compounds with aluminum chloride and sodium borohydride, but other ways known to the art may be used for producing this compound and other compounds of the above class.

The invention relates to 1,2,3,4-tetrahydro-7-halo-6-sulfamyl-4-quinazolinones and 7-tri-fluoromethyl analogs. More particularly the invention relates to compounds having the following formula:

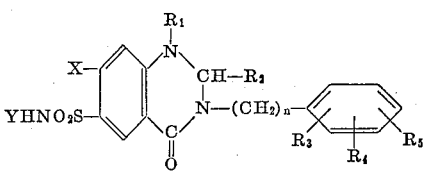

in which X is halogen or trifluoromethyl, Y is hydrogen or lower alkyl, $R_1$ is hydrogen or lower alkyl, $R_2$ is hydrogen, lower alkyl, thioalkyl, halogen substituted alkyl, aralkyl or substituted aralkyl, $R_3$ is hydrogen, lower alkyl, hydroxy, alkoxy, $NH_2$, $SO_2NH_2$, halogen or trifluoromethyl, $R_4$ and $R_5$ are any of $R_3$, and $n$ is an integer from 0–4.

In the above formula X is preferably chlorine or trifluoromethyl, but bromine and the other halogens are not precluded. $R_1$ is preferably hydrogen, but lower alkyls such as methyl, ethyl, propyl, and isopropyl may be used. $R_2$ is preferably methyl or ethyl. The thioalkyl, when used, is preferably a thio lower alkyl; the halogen of the halogen substituted alkyl is chlorine or other halogen. The aralkyl is preferably a monocyclic carbocyclic aryl lower alkyl, e.g., benzyl, but bicyclic carbocyclic aralkyl may be used, e.g., 1 or 2 naphthylmethyl. $R_3$, $R_4$, and $R_5$ may be any of the stated radicals in one or more of the ortho, meta or para positions. Preferably $R_3$ is methyl in the ortho position, also where sulfamyl is used it is preferably present in the meta or para position with methyl in the ortho position. $R_2$ may be aryl and is preferably like the aryl part of the aralkyl of $R_2$. The substituted aryl of $R_2$ and the substituted aralkyl of $R_2$ are suitably substituted with hydroxy, alkoxy (preferably lower alkoxy), lower alkyl, halogen, $SO_2NH_2$, trifluoromethyl, and $NH_2$.

Specific suitable compounds of the above formula include 2-methyl-3-o-tolyl-6-sulfamyl-7-chloro-1,2,3,4-tetrahydro-4-quinazolinone;
2-methyl-3-0-tolyl-6-sulfamyl-7-trifluoromethyl-1,2,3,4-tetrahydro-4-quinazolinone;
3-o-tolyl-6-sulfamyl-7-chloro-1,2,3,4-tetrahydro-4-quinazolinone;
2-ethyl-3-o-tolyl-6-sulfamyl-7-trifluoromethyl-1,2,3,4-tetrahydro-4-quinazolinone;
2-ethyl-3-o-tolyl-6-sulfamyl-7-chloro-1,2,3,4-tetrahydro-4-quinazolinone;
2-methyl-3-o-tolyl-6-methylaminosulfonyl-7-chloro-1,2,3,4-tetrahydro-4-quinazolinone;
2-methyl-3-(p-chlorophenyl)-6-sulfamyl-7-chloro-1,2,3,4-tetrahydro-4-quinazolinone;
2-methyl-3-o-tolyl-6-methylaminosulfonyl-7-chloro-1,2,3,4,-tetrahydro-4-quinazolinone;
2-methyl-3-phenyl-6-sulfamyl-7-chloro-1,2,3,4-tetrahyro-4-quinazolinone;
2-methyl-3-(2'-methyl-3'-chlorophenyl)-6-sulfamyl-7-chloro-1,2,3,4-tetrahydro-4-quinazolinone;
2-methyl-3-(p-chlorophenyl)-6-methylaminosulfonyl-7-chloro-1,2,3,4-tetrahydro-4-quinazolinone;
2-methyl-3-(2'-methylbenzyl)-6-sulfamyl-7-chloro-1,2,3,4-tetrahydro-4-quinazolinone;
2-phenyl-3-o-tolyl-6-sulfamyl-7-chloro-1,2,3,4-tetrahydro-4-quinazolinone;
2-propyl-3-o-tolyl-6-sulfamyl-7-chloro-1,2,3,4-tetrahydro-4-quinazolinone;
2-butyl-3-o-tolyl-6-sulfamyl-7-chloro-1,2,3,4-tetrahydro-4-quinazolinone;
2-propyl-3-o-tolyl-6-sulfamyl-7-trifluoromethyl-1,2,3,4-tetrahydro-4-quinazolinone;
2-butyl-3-o-tolyl-6-sulfamyl-7-trifluoromethyl-1,2,3,4-tetrahydro-4-quinazolinone;
2-benzylthio-methyl-3-o-tolyl-6-sulfamyl-7-chloro-1,2,3,4-tetrahydro-4-quinazolinone;
2-(2,2,2-trifluoroethylthiomethyl)-3-o-tolyl-6-sulfamyl-7-chloro-1,2,3,4-tetrahydro-4-quinazolinone;
2-ethylthiomethyl-3-o-tolyl-6-sulfamyl-7-chloro-1,2,3,4-tetrahydro-4-quinazolinone;
2-chlorometthyl-3-o-tolyl-6-sulfamyl-7-chloro-1,2,3,4-tetrahydro-4-quinazolinone;
2-dichloromethyl-3-o-tolyl-6-sulfamyl-7-chloro-1,2,3,4-tetrahydro-4-quinazolinone;
2-trichloromethyl-3-o-tolyl-6-sulfamyl-7-chloro-1,2,3,4-tetrahydro-4-quinazolinone;
2-benzyl-3-o-tolyl-6-sulfamyl-7-chloro-1,2,3,4-tetrahydro-4-quinazolinone;
2-(3'sulfamyl-4'-chlorophenyl)-3-o-tolyl-6-sulfamyl-7-chloro-1,2,3,4-tetrahydro-4-quinazolinone;
2-(3'-sulfamyl-4'-chloro-benzyl)-3-o-tolyl-6-sulfamyl-7-chloro-1,2,3,4-tetrahydro-4-quinazolinone;
2-methyl-3-(o-hydroxyphenyl)-6-sulfamyl-7-chloro-1,2,3,4-tetrahydro-4-quinazolinone;
2-methyl-3-(o-methoxyphenyl)-6-sulfamyl-7-chloro-1,2,3,4-tetrahydro-4-quinazoline;
2-methyl-3-(p-aminophenyl)-6-sulfamyl-7-chloro-1,2,3,4-tetrahydro-4-quinazolinone;
2-methyl-3-(2'-methyl-4'-aminophenyl)-6-sulfamyl-7-chloro-1,2,3,4-tetrahydro-4-quinazolinone;
2-methyl-3-(2'-methyl-3'-sulfamylphenyl)-6-sulfamyl-7-chloro-1,2,3,4-tetrahydro-4-quinazolinone;

2-methyl-3-(2'-methyl-3'-sulfamylphenyl)-6-sulfamyl-7-trifluoromethyl-1,2,3,4-tetrahydro-4-quinazolinone;
2-ethyl-3-(2'-methyl-3'chlorophenyl)-6-sulfamyl-7-trifluoromethyl-1,2,3,4-tetrahydro-4-quinazolinone;
2-methyl-3-(2'-methyl-3'-chlorophenyl)-6-methylaminosulfonyl-7-chloro-1,2,3,4-tetrahydro-4-quinazolinone;
2-ethyl-3-(2'sulfamylphenyl)-6-sulfamyl-7-chloro-1,2,3,4-tetrahydro-4-quinazolinone;
2-cyclopentylmethyl-3-o-tolyl-6-sulfamyl-7-chloro-1,2,3,4-tetrahydro-4-quinazolinone;
2-cyclobutyl-3-o-tolyl-6-sulfamyl-7-chloro-1,2,3,4-tetrahydro-4-quinazolinone;
2-cyclobutyl-3-o-tolyl-6-sulfamyl-7-trifluoromethyl-1,2,3,4-tetrahydro-4-quinazolinone;
2-cyclopropylmethyl-3-o-tolyl-6-sulfamyl-7-chloro-1,2,3,4-tetrahydro-4-quinazolinone;
2-cyclopropyl-3-o-tolyl-6-sulfamyl-7-trifluoromethyl-1,2,3,4-tetrahydro-4-quinazolinone;
2-methyl-3-benzyl-6-sulfamyl-7-chloro-1,2,3,4-tetrahydro-4-quinazolinone;
2-pentamethylene-3-o-tolyl-6-sulfamyl-7-chloro-1,2,3,4-tetrahydro-4-quinazolinone;
1,2-dimethyl-3-o-tolyl-6-sulfamyl-7-chloro-1,2,3,4-tetrahydro-4-quinazolinone;
1-benzy-2-methyl-3-o-tolyl-6-sulfamyl-7-chloro-1,2,3,4-tetrahydro-4-quinazolinone;
2-methyl-3-(2'-methyl-4'-chlorophenyl)-6-sulfamyl-7-chloro-1,2,3,4-tetrahydro-4-quinazolinone;
2-cyclobutylmethyl-3-o-tolyl-6-sulfamyl-7-chloro-1,2,3,4-tetrahydro-4-quinazolinone;
2-methyl-3-(2'-trifluoromethyl-4'-aminophenyl)-6-sulfamyl-7-chloro-1,2,3,4-tetrahydro-4-quinazolinone;
the sodium salt of 2-methyl-3-o-tolyl-6-sulfamyl-7-chloro-1,2,2,4-tetrahydro-4-quinazolinone, and
the potassium salt of 2-methyl-3-o-tolyl-6-sulfamyl-7-chloro-1,2,3,4-tetrahydro-4-quinazolinone.

The following example is given to illustrate the invention:

EXAMPLE I

*Preparation of 2-methyl-3-o-tolyl-6-sulfamyl-7-chloro-1,2,3,4-tetrahydro-4(3H)-quinazolinone*

*Synthetic Scheme:*

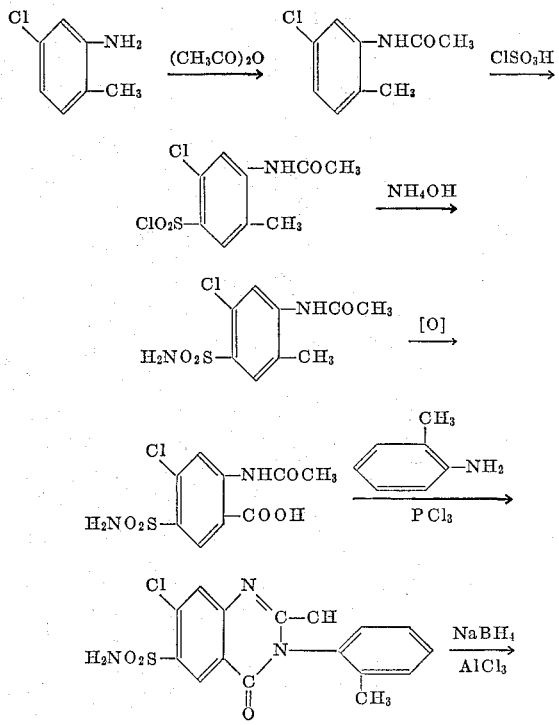

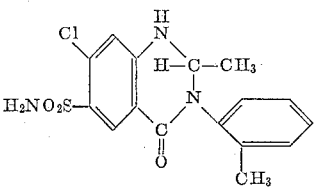

*Preparation of intermediate compound N-acetyl-5-chloro-2-methylaniline*

To a well stirred mixture of 1270 gm. (9 mole) of 5-chloro-2-methylaniline in 7.5 l. of water at 34° was added all at once 1710 ml. (18 mole) of acetic anhydride. A solution was obtained and then almost immediately the product started to crystallize. The temperature rose to 60°. The mixture was stirred until the temperature dropped to 30°. The product was filtered and washed well with water. Yield 97% (1640 gm.), M.P. 134–138°. Product was air dried and then in vacuum over $P_2O_5$.

*Preparation of intermediate compound 5-chloro-2-methyl-4-sulfamylacetanilide*

Apparatus: 3-necked 3 l. flask fitted with stirrer and thermometer.

Place 540 ml. of chlorosulfonic acid in flask and cool in ice bath to 20°. Add 300 gm. of the acetanilide portionwise while stirring and maintaining temperature at 20°. This addition takes approximately 20 minutes. Remove the ice bath and add 88 gm. of sodium chloride portionwise (approximately 1 tsp. every 10 minutes). This addition takes approximately 1 hour. Some foaming takes place. Using heating mantle bring temperature up slowly (approximately ½ hour) to 75°. Considerable foaming takes place at this time. Continue heating slowly (over period of ½ hour) until temperature of 92° is reached. Considerable foaming takes place between 75° and 92°. Foaming can be controlled by shutting off heat and with good stirring. Once the temperature of 92° has been reached and foaming has subsided reaction can be left unattended. Keep reaction at 92° for a total of 2½ hours.

Pour the hot reaction mixture onto 4 l. of crushed ice. Pour slowly and stir the ice mixture. What remains in the flask can be worked up by adding ice to it and swirling the contents. After approximately ¾ of an hour, the solid is filtered and washed with approximately 600 ml. water.

Break up cake into small pieces and add to 2.5 l. conc. NH₄OH in 4 l. beaker. Stir. Solid goes into solution and then the sulfonamide precipitates out. Heat to 50° and then turn off heat. After ½ hour cool in ice bath and filter. Wash cake with 600 ml. water. Add cake to 2 l. 5% NaOH (130 ml. 50% NaOH to 2 l. water). Filter and discard insolubles. While cooling filtrate add conc. HCl until mixture is acid. Filter and wash cake until filtrate is neutral. Suck cake as dry as possible then air dry. Yield approximately 200 gm. (45%), M.P. 255–260° C.

*Preparation of intermediate compound 4-chloro-5-sulfamyl-N-acetylanthranilic acid*

To a hot solution (80°) of 366 gm. (1.482 mole) of magnesium sulfate (Epsom salts) in 2.8 l. of water was added 130 gm. (0.495 mole) of powdered 5-chloro-2-methyl-4-sulfamylacetanilide. With stirring and maintaining the temperature at 83°, 234 gm. (1.482 mole) of potassium permanganate was added portionwise over a period of 2 hours. The mixture was then kept at 85° with stirring for an additional 3 hours. By this time the pink color of the permanganate had been discharged. The mixture was cooled to 65° and 250 gm. (2.0 mole) of sodium carbonate monohydrate was added. The warm reaction mixture was filtered and the cake washed with water. The filtrate was then slowly treated with conc. hydrochloric acid until mixture tested acid. Product was then filtered, washed with water and dried. Yield 103 gm. (71.0%), M.P. 245–249° (dec.).

*Preparation of intermediate compound 2-methyl-3-o-tolyl-6-sulfamyl-7-(chloro-4(3H)-quinazolinone*

Set up a 5 l. 3-necked flasked fitted with a stirrer, condenser and a drying tube. To a stirred mixture of 100 gm. (0.342 mole) of powdered 4-chloro-5-sulfamyl-N-acetyl-anthranilic acid, 40.2 gm. (0.376 mole) of o-toluidine and 2.0 l. of dry toluene was added dropwise, over a period of 15 minutes, 21.7 ml. (34.1 gm.) (0.248 mole) of phosphorus trichloride. The mixture was then refluxed for 10 hours. The solid turned somewhat gummy towards the latter part of the first hour. The mixture then became more free flowing as heating was continued. Let stand overnight. The yellow solid was filtered, washed with toluene and dried. The toluene filtrate was discarded.

The dried solid was triturated with 1.5 l. of 10% sodium bicarbonate, filtered and the cake washed with water. The filtrate on acidification yielded 11.5 gm. of the starting acid.

The damp product was dissolved in 4.5 l. of 95% ethanol and the solution treated with charcoal and filtered. On cooling filtrate yielded 69.5 gm. (55.5%) of the title compound, M.P. 271.5–274° C.

*Preparation of the final compound 2-methyl-3-o-tolyl-6-sulfamyl - 7 - chloro-1,2,3,4-tetrahydro-4(3H)-quinazolinone*

To 4 l. of dry diglyme in a 12 l. 3-necked flask fitted with a stirrer, thermometer and drying tube was added 5.34 gm. (0.04 mole) of aluminum chloride, while stirring. To the resulting solution was added 43.6 gm. (0.12 mole) of 2-methyl-3-o-tolyl-6-sulfamyl-7-chloro-4(3H)-quinazoline. A solution of 4.56 gm. (0.12 mole) of sodium borohydride in 1 l. of dry diglyme was added portionwise over a period of 1 hour while stirring the mixture. The mixture was then heated at 85°, with stirring, for 1 hour. After cooling the reaction mixture to 25° in an ice bath 600 ml. of water was added and then enough dil. hydrochloric acid (approx. 100 ml.) to make the solution acid. The solvent was then removed under reduced pressure at 60–70° C. The very viscid residue solidified when triturated with water. The solid was filtered and washed with water. The solid was dissolved in approximately 400 ml. 95% ethanol and the solution filtered through Celite. On cooling the solution yielded 30 gm. of colorless solid, M.P. 253–259° C. The filtrate was concentrated to 200 ml. to yield another 4.6 gm., M.P. 253–259° C.

The above product was then recrystallized from 900 ml. of 95% ethanol after filtering the hot solution through Celite. Crystallization was initiated and the mixture agitated occasionally while being cooled in the refrigerator. Yield of product 29 gm. M.P. 253–259° C. Concentration of the filtrate to 125 ml. yielded another 7.5 gm. of product, M.P. 253–259° C.

Recrystallized product, combined crops, another time in the manner described above. Total yield, 1st and 2nd crops, 28.8 gm. (66%), M.P. 250–255° C. Product was dried at 80° C. in a vacuum.

The other compounds of this invention can be made by modification of ingredients and quantities of the above example as is well understood by those skilled in the art. For example, the unsaturated quinazolinone compounds of Examples 1–6 of Japanese patent publication No. 14,021 can be readily converted to the corresponding 1,2,3,4-tetrahydro - 4(3H) - quinazolinones by reduction with sodium borohydride, as shown above for Example I.

From pharmacology tests run on 2-methyl-3-o-tolyl-6-sulfamyl-7-chloro - 1,2,3,4-tetrahydro - 4(3H)-quinazolinone (compounds S720-22) and other indications and analogy it appears that the compounds of this invention are effective diuretics, saluretics, and antihypertensives with low toxicity. For example, the following is a summary of the pharmacology on compound S720-22:

*Summary*

(a) Symptomatology and acute LD50 in mice:

*Orally.*—LD50>5000 mg./kg. (48 hours) no symptoms at 1000 mg./kg.

*Interperitoneal.*—LD50>1500 mg./kg. (48 hours) some hypothermia and decreased spontaneous motor activity at 1000 mg./kg.

(b) Cardiovascular in dog:

Doses intravenously up to 10 mg./kg. were administered. There were no changes in the cardiovascular system.

(c) Diuretic assay in rats:

When administered by the oral route in initial assays measuring output of urine (ml./kg.), Na+, and Cl− (meq./kg.) at 4 hours and 21 hours after drug administration, S720—22 was found to promote water and salt loss, has a rapid onset and prolonged action, and appears to have a potency on volume diuresis about 10 times that of hydrochlorothiazide and about 100 times that of quinethazone.

DIURETIC ASSAY IN THE RAT

| | Dose, mg./kg. | Interval, hours | Urinary Output Mean Values | | |
|---|---|---|---|---|---|
| | | | Vol., ml./kg. | meq./kg. | |
| | | | | Na+ | Cl− |
| Control | | 0–4 | 14.2 | 0.66 | 1.61 |
| Hydrochlorothiazide | 1.00 | 0–4 | *19.3 | 1.22 | 2.31 |
| | 0.10 | 0–4 | 13.2 | 0.72 | 3.42 |
| | 0.01 | 0–4 | 15.7 | 0.81 | 1.76 |
| S720-22 | 10.00 | 0–4 | *24.9 | 1.34 | 3.02 |
| | 1.00 | 0–4 | *27.3 | *1.57 | *3.52 |
| | 0.10 | 0–4 | 20.2 | *1.31 | *3.09 |
| | 0.01 | 0–4 | 18.0 | 0.67 | 2.07 |
| Control | | 4–21 | 24.8 | 1.66 | 2.41 |
| Hydrochlorothiazide | 1.00 | 4–21 | 22.5 | 1.16 | 1.76 |
| | 0.10 | 4–21 | 24.1 | 1.52 | 2.24 |
| | 0.01 | 4–21 | 25.0 | 1.60 | 2.31 |
| S720-22 | 10.00 | 4–21 | 28.7 | 2.23 | 3.22 |
| | 1.00 | 4–21 | 25.9 | 2.11 | 2.87 |
| | 0.10 | 4–21 | 22.3 | 1.65 | 2.32 |
| | 0.01 | 4–21 | 24.5 | 1.67 | 2.57 |
| Control | | 0–21 | 39.0 | 2.12 | 4.02 |
| Hydrochlorothiazide | 1.00 | 0–21 | 41.8 | 2.29 | 3.96 |
| | 0.10 | 0–21 | 37.3 | 2.25 | 5.66 |
| | 0.01 | 0–21 | 40.7 | 2.49 | 4.07 |
| S720-22 | 10.00 | 0–21 | *53.6 | *3.57 | 6.25 |
| | 1.00 | 0–21 | *53.2 | 3.47 | *6.40 |
| | 0.10 | 0–21 | 42.3 | 3.08 | 5.41 |
| | 0.01 | 0–21 | 42.5 | 2.35 | 4.65 |
| Control | | 0–4 | 15.3 | 1.15 | 2.08 |
| Quinethazone | 1.00 | 0–4 | *21.4 | *2.30 | 3.23 |
| | 0.10 | 0–4 | 17.0 | 1.26 | 2.60 |
| | 0.01 | 0–4 | 15.6 | 1.08 | 2.18 |
| S720-22 | 1.00 | 0–4 | *30.9 | *3.45 | *5.87 |
| | 0.10 | 0–4 | *33.5 | *3.59 | *6.81 |
| | 0.01 | 0–4 | *23.4 | *2.17 | *4.07 |
| Control | | 4–21 | 23.7 | 2.42 | 3.29 |
| Quinethazone | 1.00 | 4–21 | 26.4 | 2.04 | 3.09 |
| | 0.10 | 4–21 | *31.7 | 2.52 | 4.96 |
| | 0.01 | 4–21 | 28.1 | 2.54 | 4.13 |
| S720-22 | 1.00 | 4–21 | *36.0 | 2.62 | *4.57 |
| | 0.10 | 4–21 | 32.9 | 2.62 | 4.21 |
| | 0.01 | 4–21 | 33.6 | 2.56 | 4.52 |

DIURETIC ASSAY IN THE RAT—Continued

| | Dose, mg./kg. | Interval, hours | Urinary Output Mean Values | | |
|---|---|---|---|---|---|
| | | | Vol., ml./kg. | meq./kg. | |
| | | | | Na+ | Cl- |
| Control | | 0-21 | 39.0 | 3.57 | 5.53 |
| Quinethazone | 1.00 | 0-21 | *47.8 | 4.36 | 6.41 |
| | 0.10 | 0-21 | *48.9 | 3.79 | *8.02 |
| | 0.01 | 0-21 | 43.7 | 3.50 | 6.93 |
| S720-22 | 1.00 | 0-21 | *66.2 | *6.07 | *10.48 |
| | 0.10 | 0-21 | *66.4 | *6.21 | *11.27 |
| | 0.01 | 0-21 | *57.0 | *4.74 | 7.65 |

Note:
Dose=oral administration.
Interval=time interval after drug administration during which urine was collected; i,e., first 4 hours, from 4th to 21st, and total over the 21 hours.
meq./kg.=milliequivalents per kilogram of electrolyte.
K+=potassium values are being recalculated.
Additional Note:
*=statistically significant difference (p>0,05) from control value.

In the preceding specification the temperatures, wherever given, are in degrees centigrade.

Various modifications of the structural formula in Column 1, lines 43-51 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3 position. $R_1$, for example, may be an aralkyl such as benzyl or β phenethyl or substituted aralkyl such as orthochlorobenzyl, or the like, as well as hydrogen or lower alkyl. $R_2$, for example, may be alkenyl such as allyl, butenyl, and the like; also alkoxy such as methoxy, ethoxy, and the like; and aryl such as phenyl or naphthyl; and substituted aryl substituted as shown for the substituted aralkyl.

It will also be understood that any of the groups of $R_2$ may be substituted for the 2 hydrogen of the heterocycle.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic aicd cation exchange resins to give the therapeutically effective and nontoxic salts of the quinazolinone compound.

Other suitable specific compounds not mentioned above include 2-cyclopropyl-3-o-tolyl-6-sulfamyl-7-chloro-1,2,3,4-tetrahydro-4-quinazolinone;
1-methyl-2-methoxy-3-o-tolyl-6-sulfamyl-7-chloro-1,2,3,4-tetrahydro-4-quinazolinone;
1-methyl-3-o-tolyl-6-sulfamyl-7-chloro-1,2,3,4-tetrahydro-4-quinazolinone, and
3-o-tolyl-6-sulfamyl-7-chloro-1,2,3,4-tetrahydro-4-quinazolinone.

I claim:
1. A compound of the formula:

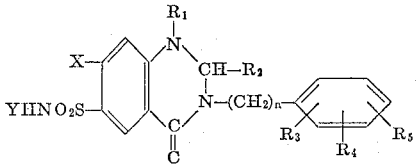

in which X is halogen or trifluoromethyl, Y is hydrogen or lower alkyl, $R_1$ is hydrogen or lower alkyl, $R_2$ is hydrogen, lower alkyl, thio loweralkyl, halogen substituted lower alkyl, aralkyl in which the aryl is phenyl or naphthyl and the alkyl is a lower alkyl, or substituted aralkyl in which the aryl is phenyl or naphthyl, the alkyl is a lower alkyl and the aryl substituent is hydroxy, lower alkoxy, lower alkyl, halogen, trifluoromethyl, sulfamyl or amino, $R_3$ is hydrogen, lower alkyl, hydroxy, lower alkoxy, $NH_2$, sulfamyl, halogen, or trifluoromethyl, $R_4$ and $R_5$ are any of the members of $R_3$, and $n$ is an integer from 0–4.

2. The compound of claim 1 wherein X is chlorine, Y is hydrogen, $R_1$ is hydrogen, $R_2$ is methyl, $R_3$ is orthomethyl, both $R_4$ and $R_5$ are hydrogen, and $n$ is 0.

3. The compound of claim 1 wherein X is chlorine, Y is hydrogen, $R_1$ is hydrogen, $R_2$ is ethyl, $R_3$ is orthomethyl, both $R_4$ and $R_5$ are hydrogen, and $n$ is 0.

4. The compound of claim 1 wherein X is chlorine, Y is hydrogen, $R_1$ is hydrogen, $R_2$ is chloromethyl, $R_3$ is ortho-methyl, both $R_4$ and $R_5$ are hydrogen, and $n$ is 0.

5. The compound of claim 1 wherein X is chlorine, Y is hydrogen, $R_1$ is hydrogen, $R_2$ is methyl, $R_3$ is ortho-trifluoromethyl, both $R_4$ and $R_5$ are hydrogen, and $n$ is 0.

6. The compound of claim 1 wherein X is trifluoromethyl, Y is hydrogen, $R_1$ is hydrogen, $R_2$ is methyl, $R_3$ is ortho-methyl, both $R_4$ and $R_5$ are hydrogen, and $n$ is 0.

7. A compound according to claim 1 in the form of a pharmaceutically acceptable salt.

8. The compound of claim 7 wherein the pharmaceutically acceptable salt is an alkali metal salt.

9. The compound of claim 7 wherein the pharmaceutically acceptable salt is a potassium salt.

10. The compound of claim 7 wherein the pharmaceutically acceptable salt is an ammonium salt.

11. The compound of claim 7 wherein the pharmaceutically acceptable salt is an acid addition salt.

References Cited

UNITED STATES PATENTS
2,976,289    3/1961    Cohen et al. _____ 260—256.5

FOREIGN PATENTS
14,021    7/1965    Japan.

OTHER REFERENCES
Chemical abstracts, vol. 63, 1965, paragraph 13286 d-e.

ALEX MAZEL, *Primary Examiner.*

NICHOLAS S. RIZZO, *Examiner.*

M. O'BRIEN, R. GALLAGHER, *Assistant Examiners.*

UNITED STATES PATENT OFFICE
CERTIFICATE OF CORRECTION

Patent No. 3,360,518    December 26, 1967

Bola Vithal Shetty

It is hereby certified that error appears in the above numbered patent requiring correction and that the said Letters Patent should read as corrected below.

Column 8, lines 3 to 9, for that portion of the formula reading

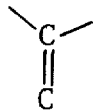    read    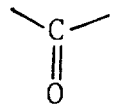

Signed and sealed this 14th day of January 1969.

(SEAL)
Attest:

Edward M. Fletcher, Jr.
Attesting Officer

EDWARD J. BRENNER
Commissioner of Patents